United States Patent
Wang et al.

(10) Patent No.: US 7,269,293 B2
(45) Date of Patent: Sep. 11, 2007

(54) VIDEO DATA ENHANCEMENT METHOD

(75) Inventors: Chao-Ming Wang, Taipei (TW);
Cheng-Liang Kao, Tainan Hsien (TW)

(73) Assignee: Huper Laboratories Co., Ltd., Taipei (TW)

( * ) Notice: Subject to any disclaimer, the term of this patent is extended or adjusted under 35 U.S.C. 154(b) by 712 days.

(21) Appl. No.: 10/709,896

(22) Filed: Jun. 4, 2004

(65) Prior Publication Data
US 2005/0063603 A1    Mar. 24, 2005

(30) Foreign Application Priority Data
Sep. 24, 2003  (TW) ............................... 92126411 A (51) Int. Cl.
*G06K 15/00*  (2006.01)
(52) U.S. Cl. ..................... 382/254; 382/168; 382/162; 358/3.26; 358/282
(58) Field of Classification Search ........ 382/169–172; 358/462–466, 282, 3.26
See application file for complete search history.

(56) References Cited

U.S. PATENT DOCUMENTS

| | | | | |
|---|---|---|---|---|
| 4,593,325 A | * | 6/1986 | Kannapell et al. | 358/3.22 |
| 2002/0097439 A1 | * | 7/2002 | Braica | 358/3.26 |

* cited by examiner

*Primary Examiner*—Jngge Wu
*Assistant Examiner*—Jayesh A Patel
(74) *Attorney, Agent, or Firm*—Winston Hsu (57) ABSTRACT

A method for enhancing video data includes inputting image data, providing a first threshold, generating a first mean gray level, generating a first minimum gray level, generating a first maximum gray level, generating a second mean gray level, generating a second minimum gray level, and generating a second maximum gray level. According to the first threshold, generate a second threshold, a third mean gray level, and a fourth mean gray level. According to the third mean gray level, the first gray level, and the first minimum gray level, generate a first gain. According to the fourth mean gray level, the second mean gray level, and the second minimum gray level, generate a second gain. Finally, according to the first mean gray level, the first gain, the third mean gray level, the second mean gray level, the second gain, and the fourth mean gray level; generate enhanced image data.

15 Claims, 8 Drawing Sheets

VIDEO DATA ENHANCEMENT METHOD

BACKGROUND OF INVENTION

1. Field of the Invention

The invention relates to video data enhancement, and more particularly, to a method for segmented processing of the intensity distribution of image graphic data.

2. Description of the Prior Art

Figure 1:
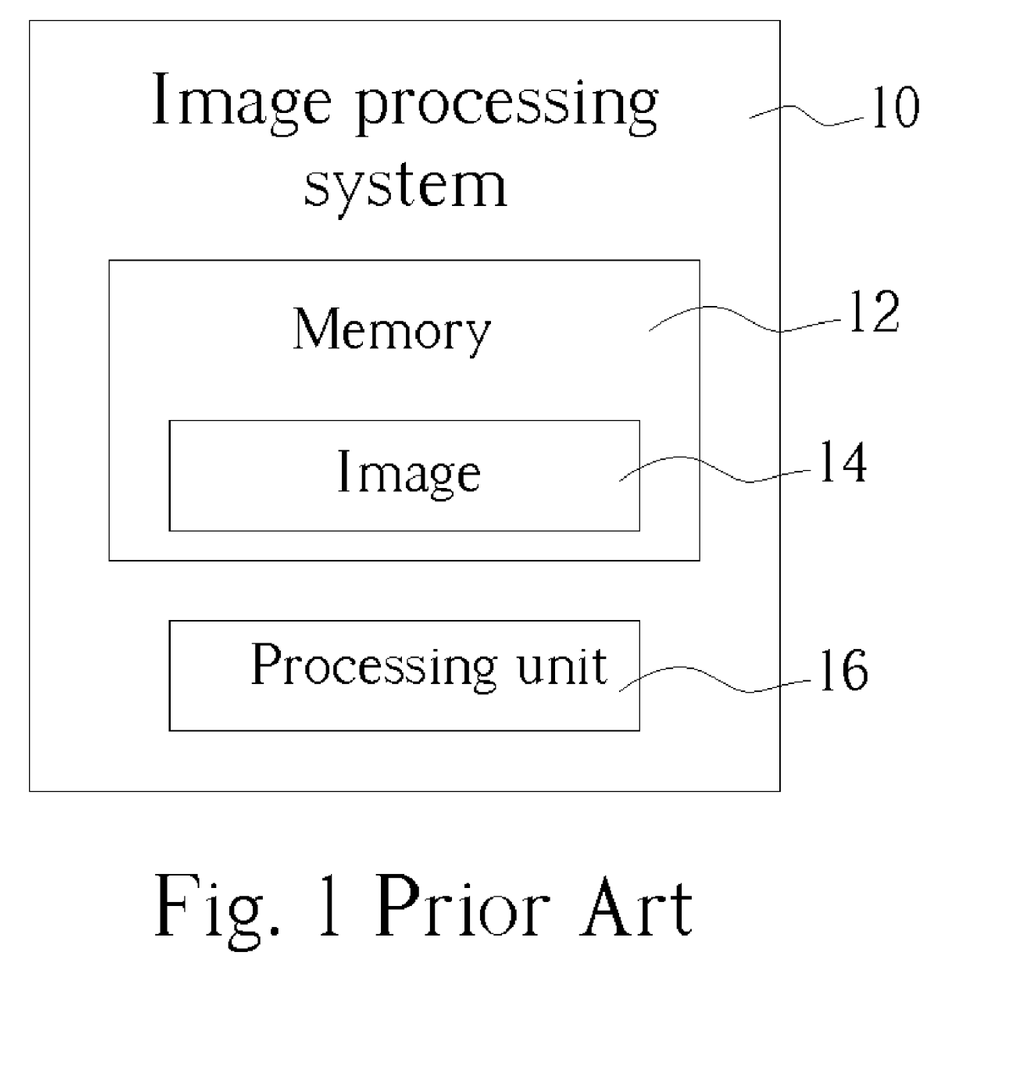
FIG. 1 is a block diagram of an image processing system according to the prior art.
Figure 2:
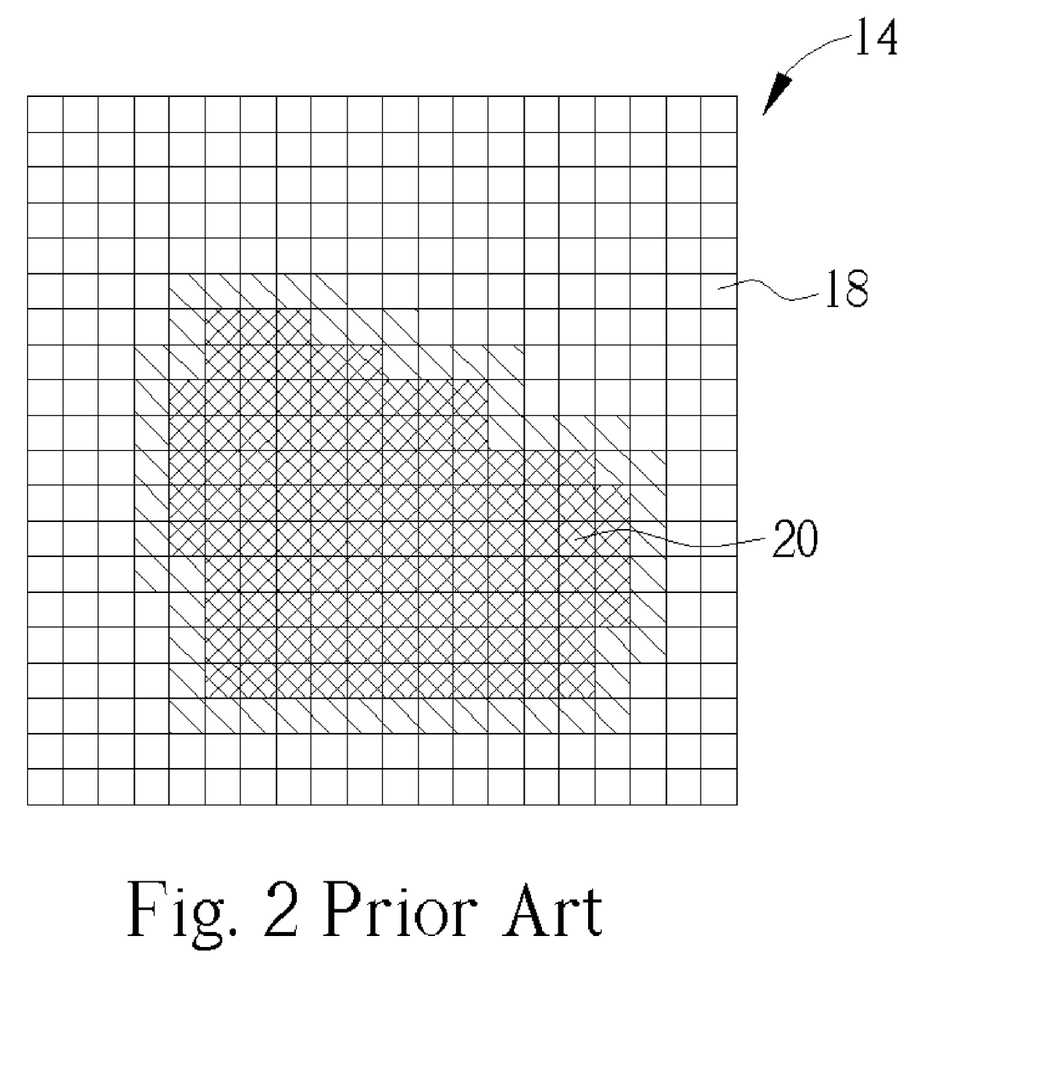
FIG. 2 is an image graphic to be processed by the image processing system of FIG. 1.

Please refer to FIG. 1 and FIG. 2. FIG. 1 shows a block diagram of an image processing system 10 according to the prior art, and FIG. 2 shows an image graphic 14 processed by the image processing system 10. The image processing system 10 includes a memory 12 for storing programs, the image graphic 14 awaiting processing, and a processing unit 16 for executing the programs stored in the memory 12. The image graphic 14 has a plurality of pixels 18 arranged in matrix form and includes a region 20 having a predefined feature.

Figure 3:
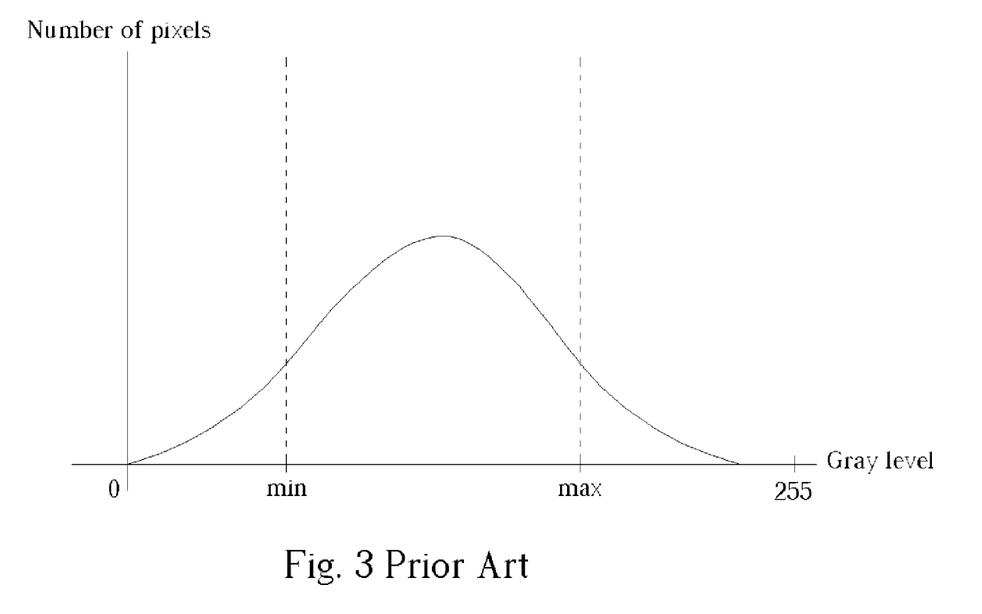
FIG. 3 is an intensity histogram for the image graphic of FIG. 1.

Please refer to FIG. 3. FIG. 3 shows an intensity histogram for the image graphic 14. The pixels 18 in the image graphic 14 are each assigned a gray level, and the intensity histogram shown in FIG. 3 graphs the number of pixels 18 in the image graphic 14 that are at each gray level. According to the prior art, image processing involves using the intensity histogram to select a maximum gray level and a minimum gray level and then performing an image processing operation on the pixels having gray levels falling between the maximum gray level and the minimum g ray level.

Figure 4:
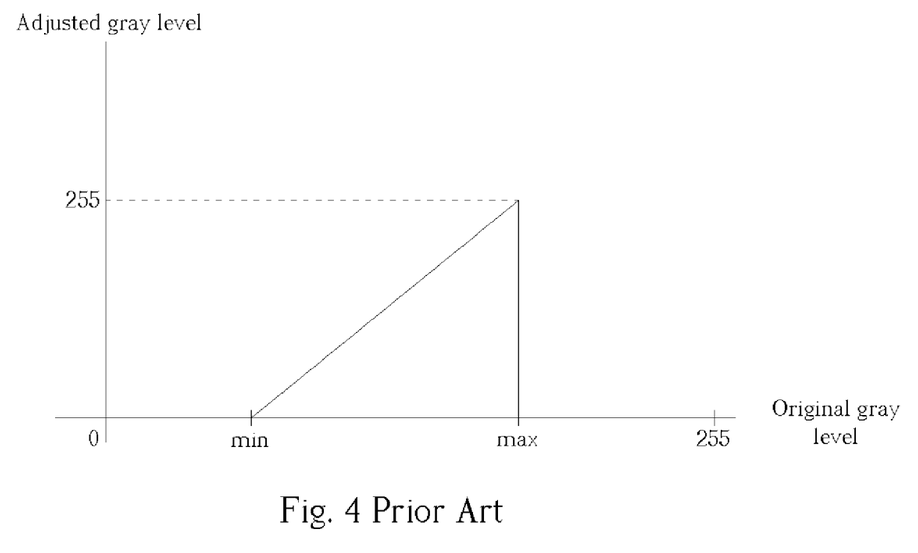
FIG. 4 is a pixel transform function used by the image processing system of FIG. 1.
Figure 5:
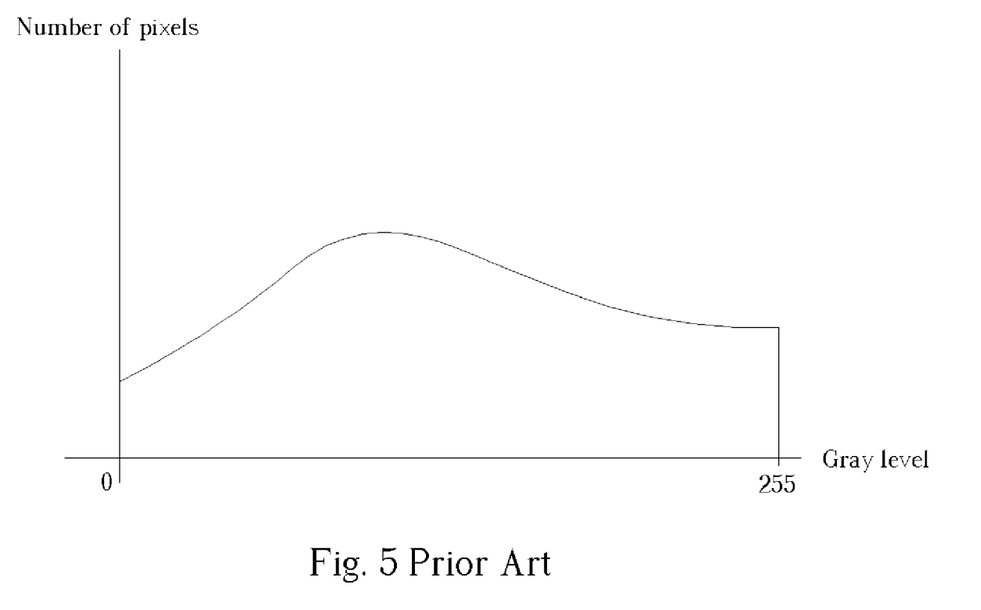
FIG. 5 is an intensity histogram of the image graphic after being processed using the pixel transformation function shown in FIG. 4.

Please refer to FIG. 4 and FIG. 5. FIG. 4 shows a transform function for pixels in the image graphic 14, where the horizontal axis represents the original gray level of the pixels before transformation and the vertical axis represents the gray level of the pixel after being transformed by the transform function. From FIG. 4 it can be seen that the transformation process involves first selecting a pixel 14 having a gray level being between the maximum gray level and the minimum gray level, and then using a linear transformation function to convert the original gray level for the pixel to an adjusted gray level being from 0 to 255. FIG. 5 shows an intensity histogram of the image graphic 14 after being processed with the transformation function shown in FIG. 4. From FIG. 5 it can be seen that the pixels having original gray levels between the maximum gray level and the minimum gray level have now been distributed between gray level 0 and gray level 255. The intensity histogram of the image graphic 14 after being processed is therefore more evenly dispersed when compared with the original intensity histogram shown in FIG. 3.

The goal of image processing is to enhance the predefined feature of the region 20 in the image graphic 14 and to increase the difference between the region 20 and the image background. The image processing technique explained above operates on and adjusts the parameters of the graphic image 14 as a whole. For this reason, the image processing technique according to the prior art is only capable of enhancing a primary block in the image graphic and is therefore not able to effectively increase the difference between the region 20 having the predefined feature and the image background. This remains as a problem to be solved.

SUMMARY OF INVENTION

It is therefore a primary objective of the claimed invention to provide a method for image data enhancement, to solve the above-mentioned problem.

According to the claimed invention, a method is disclosed for enhancing video image data. The method comprises the following steps: (a) inputting image data having a plurality of pixels; (b) providing a first gray level range and a second gray level range; according to the plurality of pixels in the image data being within the first gray level range, generating a first mean gray level, a first minimum gray level, a first maximum gray level; and according to the plurality of pixels in the image data being within the second gray level range, generating a second mean gray level, a second minimum gray level, and a second maximum gray level; wherein the boundary between the first gray level range and the second gray level range is a first threshold; (c) according to the first threshold, generating a second threshold; according to the second threshold, the first mean gray level, the first minimum gray level, and the first maximum gray level, generating a third mean gray level; and according to the second threshold, the second mean gray level, the second minimum gray level, and the second maximum gray level, generating a fourth mean gray level; (d) according to the third mean gray level, the first mean gray level, and the first minimum gray level, generating a first gain value; and according to the fourth mean gray level, the second mean gray level, the second minimum gray level, generating a second gain value; and (e) according to the first mean gray level, the first gain value, the third mean gray level, the second mean gray level, the second gain value, and the fourth mean gray level, generating adjusted image data gray levels for the first gray level range and the second gray level range.

These and other objectives of the claimed invention will no doubt become obvious to those of ordinary skill in the art after reading the following detailed description of the preferred embodiment that is illustrated in the various figures and drawings.

DETAILED DESCRIPTION

Figure 6:
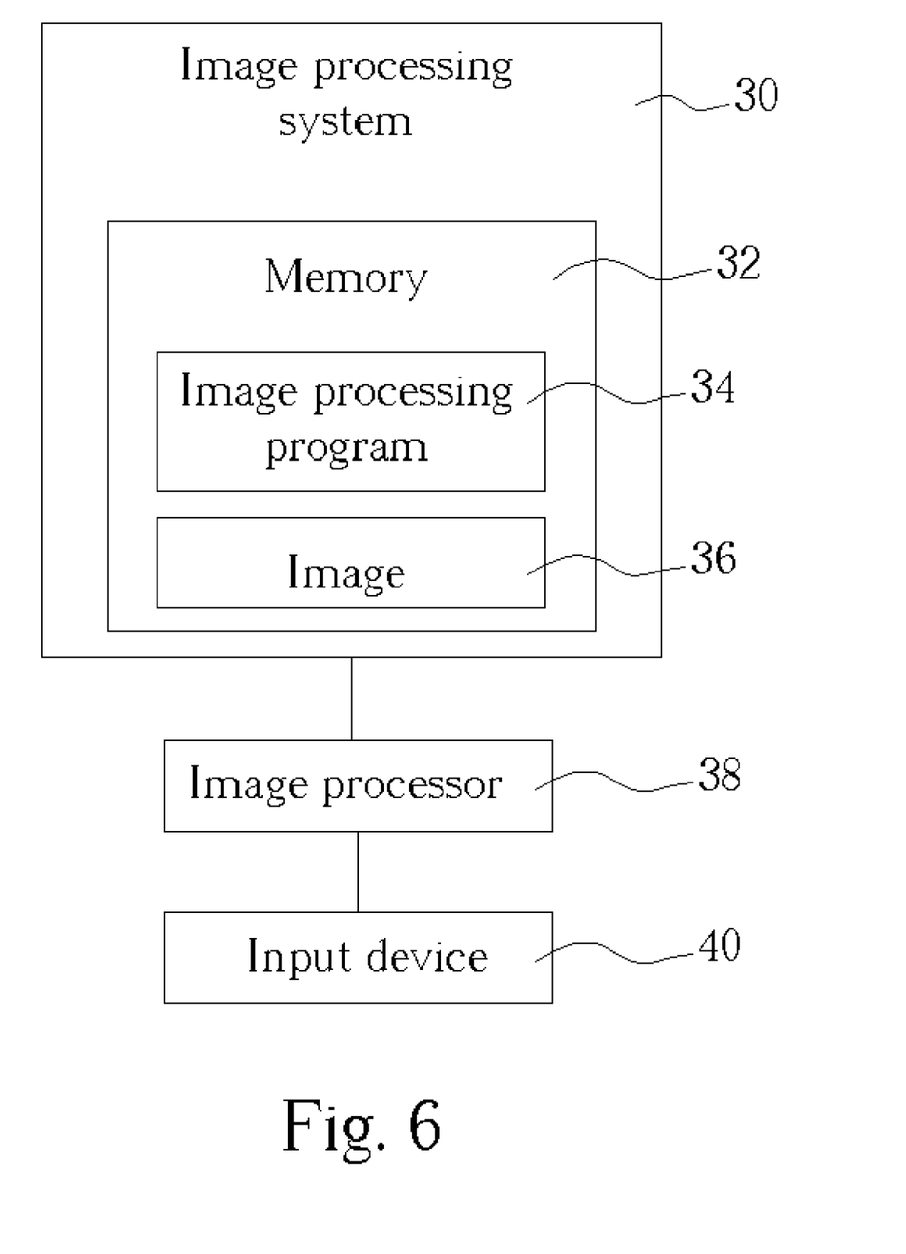
FIG. 6 is a block diagram of an image processing system according to the present invention.

Please refer to FIG. 6. FIG. 6 shows a block diagram of an image processing system 30 according to the present invention and includes a memory 32 for storing an image processing program 34 and an image graphic 36 waiting to be processed. The image processing system 30 further includes an image processor 38 for executing the image processing program 34 stored in the memory 32 and a user interface input device 40 allowing the user to control and configure parameter settings.

Figure 7:
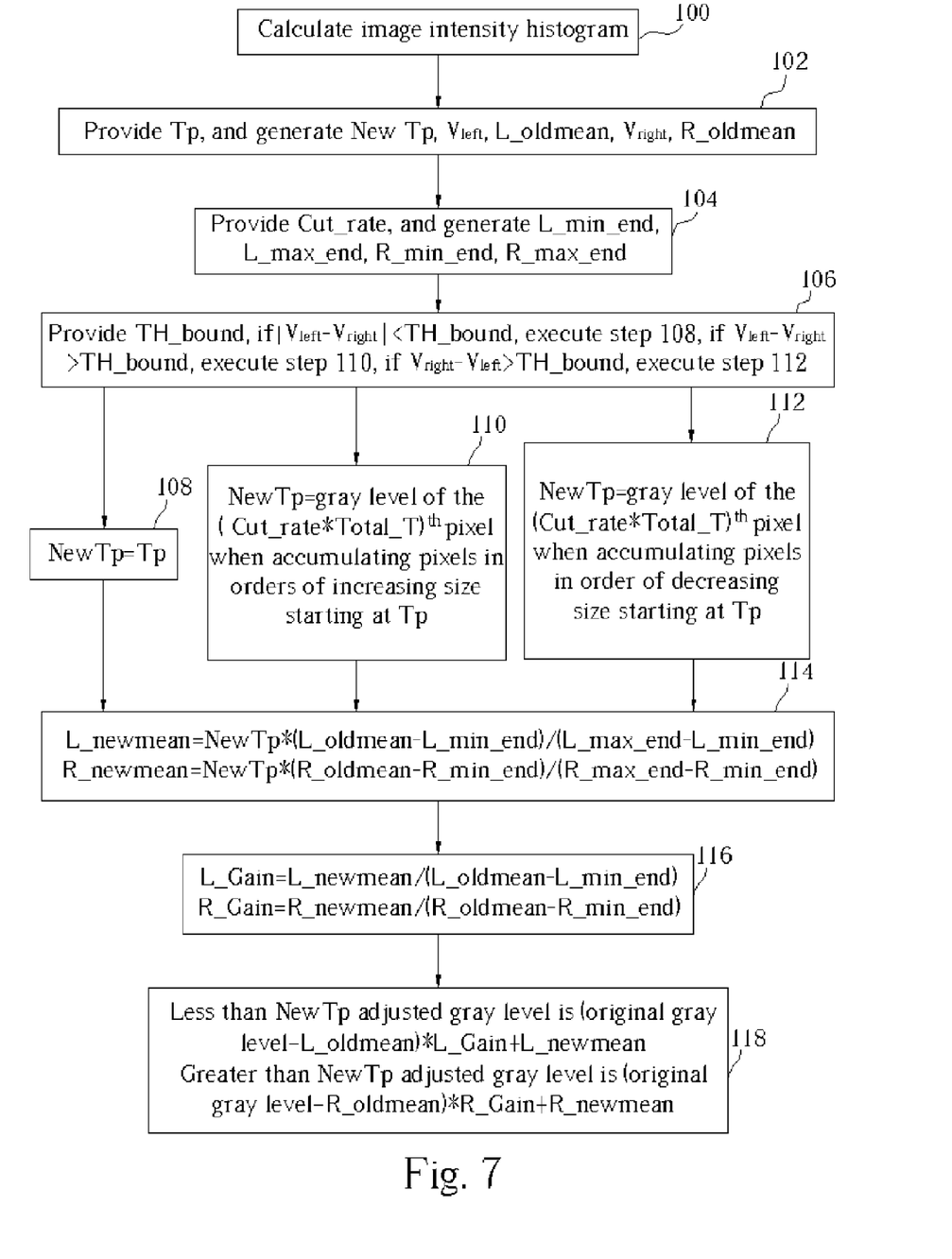
FIG. 7 is a flowchart describing a first method of image processing according to a first embodiment of the present invention.

Please refer to FIG. 7. FIG. 7 shows a flowchart describing a first method of image processing according to a first embodiment of the present invention and includes the following steps:

Step 100:Calculate an intensity histogram for the image graphic 36 including the number of pixels at each gray level and a total number of pixels (Total_T) for the whole image graphic 36.

Step 102:Provide a first threshold (Tp) and according to the first threshold (Tp) generate a second threshold (NewTp), a first pixel count (Vleft) being the number of pixels in the image graphic 36 having a gray level from gray level 0 to the first threshold (Tp), a first mean gray level (L_oldmean) being the mean gray level of the first pixel count (Vleft), a second pixel count (Vright) being the number of pixels in the image graphic 36 having a gray level from the first threshold (Tp) to gray level 255, and a second mean gray level (R_oldmean) being the mean gray level of the second pixel count (Vright).

Step 104:Provide a cutoff percentage (Cut_rate). According to the cutoff percentage (Cut_rate), generate a first minimum gray level (L_min_end) being the gray level of the nth pixel when accumulating the pixels in order of increasing gray levels starting at gray level 0, wherein n is equal to the cutoff percentage (Cut_rate) multiplied by the total number of pixels (Total_T); and a first maximum gray level (L_max_end) being the gray level of the $n^{th}$ pixel when accumulating the pixels in order of decreasing gray levels starting at the first threshold (Tp), wherein n is equal to the cutoff percentage (Cut_rate) multiplied by the total number of pixels (Total_T). Using the same logic, further generate a second minimum gray level (R_min_end) being the gray level of the $n^{th}$ pixel when accumulating the pixels in order of increasing gray levels starting at the first threshold (Tp), wherein n is equal to the cutoff percentage (Cut_rate) multiplied by the total number of pixels (Total_T); and a second maximum gray level (R_max_end) being the gray level of the nth pixel when accumulating the pixels in order of decreasing gray levels starting at the gray level 255, wherein n is equal to the cutoff percentage (Cut_rate) multiplied by the total number of pixels (Total_T).

Step 106:Provide a first tolerance value (TH_bound). If the difference between the first pixel count (Vleft) and the second pixel count (Vright) is less than the tolerance value (TH_bound), proceed to step 108. If the difference when the second pixel count (Vright) is subtracted from the first pixel count (Vleft) is greater than the tolerance value TH_bound, proceed to step 110. Otherwise, if the difference when the first pixel count (Vleft) is subtracted from the second pixel count (Vright) is greater than the tolerance value (TH_bound), proceed to step 112.

Step 108:If the difference between the first pixel count (Vleft) and the second pixel count (Vright) is less than the tolerance value (TH_bound), set the second threshold (NewTp) equal to the first threshold (Tp). Proceed to step 114.

Step 110:If the difference when the second pixel count (Vright) is subtracted from the first pixel count (Vleft) is greater than the tolerance value TH_bound, set the second threshold (NewTp) equal to the gray level of the nth pixel when accumulating the pixels in order of increasing gray levels starting at the first threshold (Tp), wherein n is equal to the cutoff percentage (Cut_rate) multiplied by the total number of pixels (Total_T). Proceed to step 114.

Step 112:If the difference when the first pixel count (Vleft) is subtracted from the second pixel count (Vright) is greater than the tolerance value (TH_-bound), set the second threshold (NewTp) equal to the gray level of the $n^{th}$ pixel when accumulating the pixels in order of decreasing gray levels starting at the first threshold (Tp), wherein n is equal to the cutoff percentage (Cut_rate) multiplied by the total number of pixels (Total_T). Proceed to step 114.

Step 114:According to the second threshold (NewTp), the first mean gray level (L_oldmean), the first minimum gray level (L_min_end), and the first maximum gray level (L_max_end), generate a third mean gray level (L_newmean). According to the second threshold (NewTp), the second mean gray level (R_oldmean), the second minimum gray level (R_min_end), and the second maximum gray level (R_max_end), generate a fourth mean gray level (R_newmean). Wherein the third mean gray level (L_newmean) is equal to (NewTp*(L_oldmean L_min_end)/ (L_max_end L_min_end), and the fourth mean gray level (R_newmean) is equal to (255 NewTp)*(R_oldmean R_min_end)/(R_max_end R_min_end)+NewTp.

Step 116:According to the third mean gray level (L_newmean), the first mean gray level (L_oldmean), and the first minimum gray level (L_min_end), generate a first gain value (L_Gain). According to the fourth mean gray level (R_newmean), the second mean gray level (R_oldmean), and the second minimum gray level (R_min_end), generate a second gain value (R_Gain). Wherein the first gain value (L_Gain) is equal to L_newmean/(L_oldmean L_min_end), and the second gain value (R_Gain) is equal to (R_newmean NewTp)/(R_oldmean R_min_end).

Step 118:According to the first mean gray level (L_oldmean), the first gain value (L_Gain), the third mean gray level (L_newmean), the second mean gray level (R_oldmean), the second gain value (R_Gain), and the fourth mean gray level (R_newmean), generate adjusted image data gray levels. In order to generate adjusted image data gray levels for pixels being less than the second threshold (NewTp), the difference of the original gray level of each pixel having a gray level being less than the second threshold (NewTp) and the first mean gray level (L_oldmean) is multiplied with the first gain value (L_Gain) and added to the third mean gray level (L_newmean). In order to generate adjusted image data gray levels for pixels being greater than the second threshold (NewTp), the difference of the original gray level of each pixel having a gray level being greater than the second threshold (NewTp) and the second mean gray level (R_newmean) is multiplied with the second gain value (R_Gain) and added to the fourth mean gray level (R_newmean). Finally, combine the adjusted image data gray levels for pixels being less than the second threshold (NewTp) and the adjusted image data gray levels for pixels being greater than the second threshold (NewTp) to generate adjusted gray levels for the entire image graphic 36.

A further description of the above steps is as follows. In step 100, statistics can be used to integrate the pixel counts for each gray level in the intensity histogram (not described in this document) and determine the total number of pixels (Total_T). In other words, the total number of pixels (Total_T) is the area under the curve in the intensity histogram. In step 102, the first threshold (Tp) can be input using a user interface. For example, a scroll bar could be used to set the size of the first threshold (Tp) or the first threshold (Tp) could be directly entered using the input device. Alternatively, in another embodiment, the product of the first threshold (Tp) and a first weighting factor is added to the product of a mean gray level for the entire image graphic 36 and a second weighting factor, wherein the sum of the first weighting factor and the second weighting factor is 1. The first weighting factor and the second weighting factor account for whether the original image data on a whole is biased dark, biased bright, or biased normally. In step 102, statistics can again be used to determine the area under the image intensity histogram from gray level 0 to the first threshold (Tp) for the image graphic 36, generate the first pixel count (Vleft), and calculate the first mean gray level (L_oldmean). Similar logic can be used to find the area under the image intensity histogram from the first threshold (Tp) to gray level 255 for the image graphic 36, generate the second image count (Vright), and calculate the second mean gray level (R_oldmean).

In step 104, the cutoff percentage (Cut_rate) is used to select an area in which the image processing will take place. For example, if the cutoff percentage (Cut_rate) is 5%, this represents two cutoff regions located on the two ends of the image intensity histogram, each cutoff region being 5% of the total number of pixels. In this case, the first minimum gray level (L_min_end) is the gray level of the nth pixel when accumulating the pixels in order of increasing gray levels starting at gray level 0, where n is equal to the cutoff percentage (5%) multiplied by the total number of pixels (Total_T). And the first maximum gray level (L_max_end) is the gray level of the nth pixel when accumulating the pixels in order of decreasing gray levels starting at the first threshold (Tp), where n is equal to the cutoff percentage (5%) multiplied by the total number of pixels (Total_T). Using similar logic, the second minimum gray level (R_min_end) is the gray level of the $n^{th}$ pixel when accumulating the pixels in order of increasing gray levels starting at the first threshold (Tp), where n is equal to the cutoff percentage (5%) multiplied by the total number of pixels (Total_T). And the second maximum gray level (R_max_end) is the gray level of the $n^{th}$ pixel when accumulating the pixels in order of decreasing gray levels starting at gray level 255, where n is equal to the cutoff percentage (5%) multiplied by the total number of pixels (Total_T). It should be noted that the cutoff percentage (Cut_rate) can be a preset parameter of the image processing program 34 or can be a user-selectable parameter input using the user interface input device 40. Furthermore, the present invention is not restricted to using the above-mentioned technique of multiplying the cutoff percentage (cut_rate) by the total number of pixels (Total_T) in order to determine the cutoff area. Other techniques can also be used such as allowing the user to directly specify the cutoff area using the user interface input device 40.

In step 106, the tolerance value (TH_bound) is used to compare the two pixel counts determined using the first threshold (Tp) and thereby judge whether to automatically switch to normal, biased dark, or biased bright image processing. In the first embodiment of the present invention, if the difference between the first pixel count (Vleft) and the second pixel count (Vright) is less than the tolerance value (TH_bound), it is not necessary to display the image graphic 36 particularly brightened or particularly darkened. In this case, normal image processing can be used to enhance the image as a whole. If the difference when the second pixel count (Vright) is subtracted from the first pixel count (Vleft) is greater than the tolerance value (TH_bound), proceed to step 110. In this case, because the first threshold (Tp) left side pixel count is greater than the right side pixel count and the difference exceeds the tolerance value (TH_bound), the image graphic 36 is biased dark and biased dark image processing is used to enhance the biased dark area of the image. In step 110, the new threshold is determined by moving the original first threshold (Tp) to the right to form the second threshold (NewTp). In other words, the darker area (the area having the lower gray levels) is increased in size and then image processed. If the difference when the first image count (Vleft) is subtracted from the second image count (Vright) is greater than the tolerance value (TH_bound) proceed to step 112. In this case, because the first threshold (Tp) right side pixel count is greater than the left side pixel count and the difference exceeds the tolerance value (TH_bound), the image graphic 36 is biased bright and biased bright image processing is used to enhance the biased bright area of the image. In step 112, the new threshold is determined by moving the original first threshold (Tp) to the left to form the second threshold (NewTp). In other words, the lighter area (the area having the higher gray levels) is increased in size and then image processed. It should also be noted that the second threshold (NewTp) determined in steps 110 and 112 could also be input from the user. It is not a required limitation of the present invention that the cutoff percentage (Cut_rate) is multiplied by the total number of pixels (Total_T) in order to determine the second threshold.

The present invention therefore judges if the image is biased normally, biased dark, or biased bright and then automatically selects the type of image processing being either normal processing, biased dark processing, or biased bright processing. The user can also directly select whether to use normal processing, biased dark processing, or biased bright processing by using the user interface input device 40 to select "normal processing", "biased dark processing", "biased bright processing", or "automatic processing". These selections can be located on four separate buttons allowing the user to choose the image processing mode. According to the image processing mode command received, the image processing system 30 switches to the corresponding image processing type. For example, if the user pushes the "normal processing" button, normal processing mode will be selected and operations will proceed to step 108. If the user pushes the "biased dark processing" button, biased dark processing mode will be selected and operations will proceed to step 110. If the user pushes the "biased bright processing" button, biased bright processing mode will be selected and operations will proceed to step 112. Finally, if the user pushes the "automatic processing" button, automatic processing mode will be selected and operations will proceed to step 106 where according to the judgment made in step 106, either normal processing mode, biased dark processing mode, or biased bright processing mode will be used.

In step 114, step 116, and step 118, the adjusted image data gray levels can be generated as follows. For pixels having gray levels less than the second threshold (NewTP), the adjusted image data gray levels are: (original gray levels of pixels less than the second threshold NewTp the first mean gray level L_oldmean)*(the first gain value L_gain)+(the third mean gray level L_newmean). For pixels having gray levels greater than the second threshold (NewTp), the adjust image data gray levels are: (the original gray levels of the pixels greater than the second threshold NewTp the second mean gray level R_oldmean)*(the second gain value R_Gain)+(the fourth mean gray level R_newmean). Finally, combine the adjusted image data gray levels for the pixels having gray levels less than the second threshold (NewTp) and for the pixels having gray levels larger than the second threshold (NewTp) to generate adjusted image data gray levels for the whole image graphic 36.

If a more smoothed image enhancement result is desired, the original gray levels of the image data can be multiplied by a third weighting factor and then added to the adjusted image data gray levels generated in step 118 multiplied by the first weighting factor to generate final adjusted image data gray levels, wherein the third weighting factor and the first weighting factor sum to a value of 1.

Figure 8:
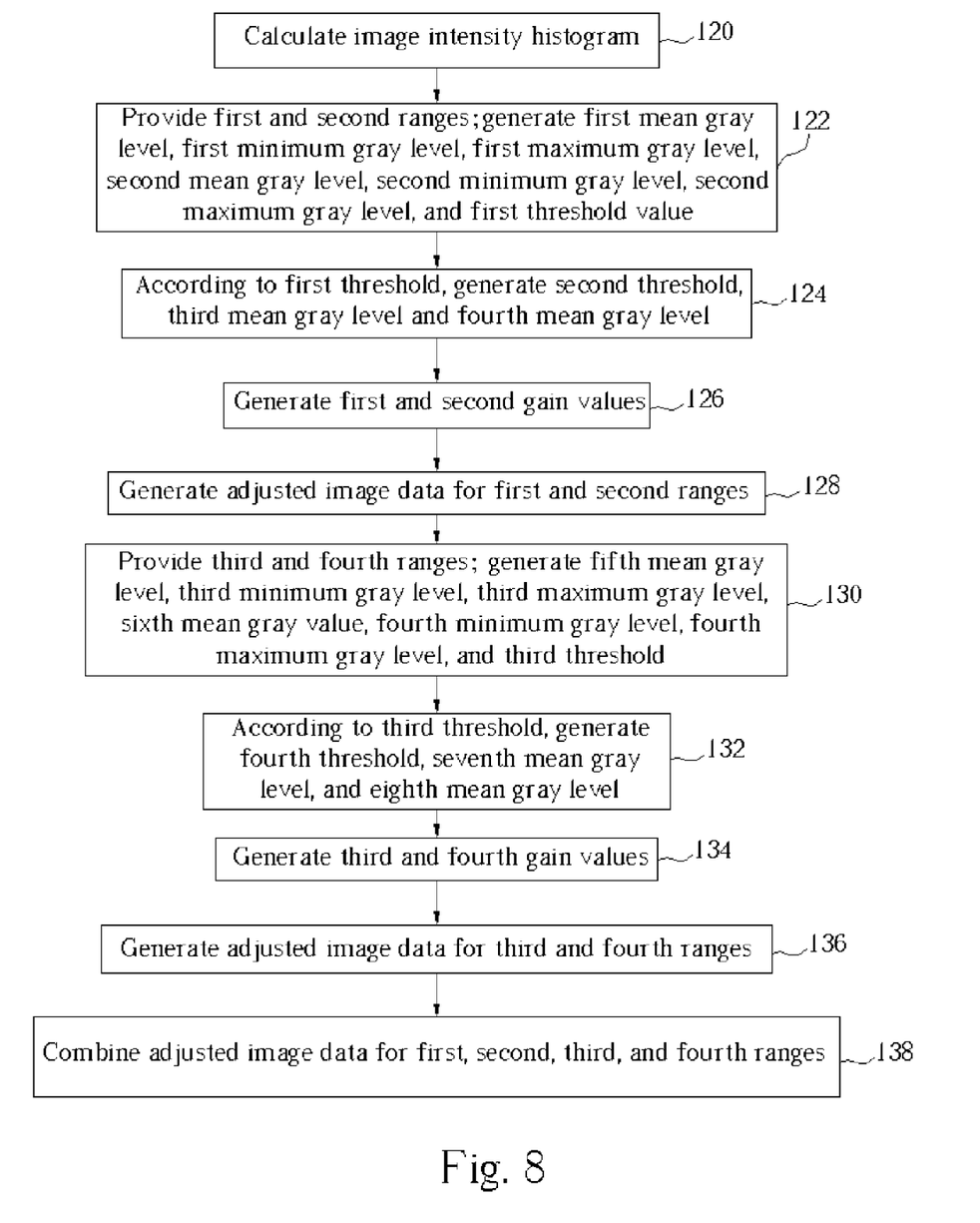
FIG. 8 is a flowchart describing a second method of image processing according to a second embodiment of the present invention.

Please refer to FIG. 8. FIG. 8 shows a flowchart describing a second method of image processing according to a second embodiment of the present invention and comprises the following steps:

Step 120:Calculate an image intensity histogram for the image graphic 36, calculate the number of pixels for each gray level in the image graphic 36, and calculate the total number of pixels in the image graphic 36.

Step 122:Provide a first gray level range and a second gray level range. According to the plurality of pixels in the image data being within the first gray level range, generate a first mean gray level, a first minimum gray level, and a first maximum gray level. According to the plurality of pixels in the image data being within the second gray level range, generate a second mean gray level, a second minimum gray level, and a second maximum gray level. Wherein the boundary between the first gray level range and the second gray level range is a first threshold.

Step 124:According to the first threshold, generate a second threshold and according to the second threshold, the first mean gray level, the first minimum gray level, and the first maximum gray level, generate a third mean gray level. According to the second threshold, the second mean gray level, the second minimum gray level, and the second maximum gray level, generate a fourth mean gray level.

Step 126:According to the third mean gray level, the first mean gray level, and the first minimum gray level, generate a first gain value. According to the fourth mean gray level, the second mean gray level, and the second minimum gray level, generate a second gain value.

Step 128:According to the first mean gray level, the first gain value, the third mean gain value, the second mean gray level, the second gain value, and the fourth mean gray level, generate adjusted image data gray levels for the first gray level range and the second gray level range.

Step 130:Provide a third gray level range and a fourth gray level range. According to the plurality of pixels in the image data being within the third gray level range, generate a fifth mean gray level, a third minimum gray level, and a third maximum gray level. According to the plurality of pixels in the image data being within the second gray level range, generate a sixth mean gray level, a fourth minimum gray level, and a fourth maximum gray level. Wherein the boundary between the third gray level range and the fourth gray level range is a third threshold.

Step 132:According to the third threshold, generate a fourth threshold and according to the fourth threshold, the fifth mean gray level, the third minimum gray level, and the third maximum gray level, generate a seventh mean gray level. According to the fourth threshold, the sixth mean gray level, the fourth minimum gray level, and the fourth maximum gray level, generate an eighth mean gray level.

Step 134:According to the seventh mean gray level, the fifth mean gray level, and the third minimum gray level, generate a third gain value. According to the eighth mean gray level, the sixth mean gray level, and the fourth minimum gray level, generate a fourth gain value.

Step 136:According to the fifth mean gray level, the third gain value, the seventh mean gray level, the sixth mean gray level, the fourth gain value, and the eighth mean gray level, generate adjusted image data gray levels for the third gray level range and adjusted image data gray levels for the fourth gray level range.

Step 138:Combine the adjusted image data for the first gray level range and the second gray level range with the adjusted pixel data for the third gray level range and the fourth gray level range to produce adjust gray levels for the whole image graphic 36.

The basic idea behind the second embodiment of the present invention is the same as the technique in the first embodiment, however, the second embodiment divides the image graphic 36 into 4 different segments: the first gray level range, the second gray level range, the third gray level range, and the fourth gray level range. The image processing technique for each segment is the same as described for the first embodiment and a repeated description is therefore omitted. The adjusted image data gray levels for the four different segments are then combined to form adjusted image data gray levels for the image graphic 36.

Besides the two embodiments previously described that divide the image graphic 36 into two ranges or four segments, or other embodiments that divide the image graphic into another number of segments and then perform image enhancement on each range, it is also possible to use the image intensity histogram to determine ranges having special or significant features. Segmented processing can then be performed for each range or segment using the image processing technique described herein.

In contrast to the prior art, the method of image enhancement according to the present invention is a segmented image intensity distribution adjustment method using rules to enhance the video image data. Because the present invention includes normal processing mode, biased dark processing mode, biased bright processing mode, and automatic processing mode; video taken in poor lighting conditions, video taken at night, and in normal lighting conditions are all noticeable improved. Furthermore, besides normal image processing, the present invention can also be used in high speed processing systems (real time) to provide image enhancement. For example, the video data received by surveillance video camera recorders and equipment, digital video cameras, and digital video recorders can all be enhanced by the present invention in real time. Additionally, because the present invention automaticallyjudges whether the image is biased dark, biased normally, or biased bright, a more effective image enhancement is performed when compared with the prior art. Also, the present invention does not only do image enhancement to the whole image or a region of the image and neglect enhancing the difference between the region having a predefined feature and the image background. The present invention can be used at night, or low light/non-optimal light conditions to enhance the clearness and sharpness of the video image and enhance the difference with the background.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for enhancing video image data, the method comprising the following steps:

(a) inputting image data having a plurality of pixels;

(b) providing a first gray level range and a second gray level range; according to the plurality of pixels in the image data being within the first gray level range, generating a first mean gray level, a first minimum gray level, a first maximum gray level; and according to the plurality of pixels in the image data being within the second gray level range, generating a second mean gray level, a second minimum gray level, and a second maximum gray level; wherein the boundary between the first gray level range and the second gray level range is a first threshold;

(c) according to the first threshold, generating a second threshold; according to the second threshold, the first mean gray level, the first minimum gray level, and the first maximum gray level, generating a third mean gray level; and according to the second threshold, the second mean gray level, the second minimum gray level, and the second maximum gray level, generating a fourth mean gray level;

(d) according to the third mean gray level, the first mean gray level, and the first minimum gray level, generating a first gain value; and according to the fourth mean gray level, the second mean gray level, the second minimum gray level, generating a second gain value; and (e) according to the first mean gray level, the first gain value, the third mean gray level, the second mean gray level, the second gain value, and the fourth mean gray level, generating adjusted image data gray levels for the first gray level range and the second gray level range.

2. The method of claim 1, wherein step (b) further comprises according to the first threshold, generating a first pixel count being the total number of image data pixels being between gray level 0 and the first threshold, and generating a second pixel count being the total number of image data pixels being between the first threshold and gray level 255; wherein the first mean gray level is the average gray level of the first pixel count, and the second mean gray level is the average gray level of the second pixel count.

3. The method of claim 1, further comprising providing a cutoff percentage; wherein the first minimum gray level, the first maximum gray level, the second minimum gray level, and the second maximum gray level are generated also according to the cutoff percentage.

4. The method of claim 3, wherein in step (b), the first minimum gray level is the gray level of the $n^{th}$ pixel when accumulating the pixels in order of increasing gray levels starting at gray level 0, n being equal to the cutoff percentage multiplied by the total number of pixels; the first maximum gray level is the gray level of the $n^{th}$ pixel when accumulating the pixels in order of decreasing gray levels starting at the first threshold, n being equal to the cutoff percentage multiplied by the total number of pixels; the second minimum gray level is the gray level of the $n^{th}$ pixel when accumulating the pixels in order of increasing gray levels starting at the first threshold, n being equal to the cutoff percentage multiplied by the total number of pixels; and the second maximum gray level is the gray level of the $n^{th}$ pixel when accumulating the pixels in order of decreasing gray levels starting at gray level 255, n being equal to the cutoff percentage multiplied by the total number of pixels.

5. The method of claim 1, wherein step (c) further comprises providing a tolerance value; if the difference between the first pixel count and the second pixel count is less than the tolerance value, setting the second threshold equal to the first threshold; if the difference when the second pixel count is subtracted from the first pixel count exceeds the tolerance value, setting the second threshold to the gray level of the $n^{th}$ pixel when accumulating the pixels in order of increasing gray levels starting at the first threshold, wherein n is equal to the cutoff percentage multiplied by the total number of pixels; and if the difference when the first pixel count is subtracted from the second pixel count exceeds the tolerance value, setting the second threshold to the gray level of the nth pixel when accumulating the pixels in order of decreasing gray levels starting at the first threshold, wherein n is equal to the cutoff percentage multiplied by the total number of pixels.

6. The method of claim 4, wherein in step (c), the third mean gray level is:
(the second threshold)*(the first mean gray level the first minimum gray level)/(the first maximum gray level the first minimum gray level); and
the fourth mean gray level is:
(255 the second threshold)*(the second mean gray level the second minimum gray level)/(the second maximum gray level the second minimum gray level)+the second threshold.

7. The method of claim 1, wherein in step (d), the first gain value is:
(the third mean gray level)/(the first mean gray level the first minimum gray level); and
the second gain value is:
(the fourth mean gray level the second threshold)/(the second mean gray level the second minimum gray level).

8. The method of claim 1, wherein step (e) comprises multiplying the difference between the original gray level of pixels being less than the second threshold and the first mean gray level with the first gain value, and then adding the third mean gray level to generate adjusted image data gray levels for pixels less than the second threshold; multiplying the difference between the original gray level of pixels being greater than the second threshold and the second mean gray level with the second gain value, and then adding the fourth mean gray level to generate adjusted image data gray levels for pixels greater than the second threshold; and combining the adjusted image data gray levels for pixels less than and greater than the second threshold to generate adjusted gray levels for the image data.

9. The method of claim 1, wherein the first threshold is input from a user interface.

10. The method of claim 9, wherein the first threshold is the product of a threshold input from the user interface multiplied by a first weighting factor added to the product of a mean gray level of all the pixels of the original image data multiplied by a second weighting factor.

11. The method of claim 10, wherein the sum of the first weighting factor and the second weighting factor is 1.

12. The method of claim 1, further comprising generating final adjusted image data gray levels by adding the product of the original image data gray levels and a third weighting factor to the product of the adjusted image data gray levels generated in step (e) and a fourth weighting factor.

13. The method of claim 12, wherein the sum of the third weighting factor and the fourth weighting factor is 1.

14. The method of claim 1, further comprising the following steps:
(f) providing a third gray level range and a fourth gray level range; according to the plurality of pixels in the image data being within the third gray level range, generating a fifth mean gray level, a third minimum gray level, and a third maximum gray level; and according to the plurality of pixels in the image data belonging to the fourth gray level range, generating a sixth mean gray level, a fourth minimum gray level, and a fourth maximum gray level; wherein the boundary between the third gray level range and the fourth gray level range is a third threshold;

(g) according to the third threshold, generating a fourth threshold; according to the fourth threshold, the fifth mean gray level, the third minimum gray level, and the third maximum gray level, generating a seventh mean gray level; and according to the fourth threshold, the sixth mean gray level, the fourth minimum gray level, and the fourth maximum gray level, generating an eighth mean gray level;

(h) according to the seventh mean gray level, the fifth mean gray level, and the third minimum gray level, generating a third gain value; and according to the eighth mean gray level, the sixth mean gray level, and the fourth minimum gray level, generating a fourth gain value; and (i) according to the fifth mean gray level, the third gain value, the seventh mean gray level, the sixth mean gray level, the fourth gain value, and the eighth mean gray level, generating adjusted image data gray levels for the third gray level range and the fourth gray level range.

15. An image processing system using the method of claim 1.

* * * * *